Aug. 11, 1970     C. S. MILLER     3,523,470
DRILL PRESS CONTROL DEVICE
Filed May 1, 1968
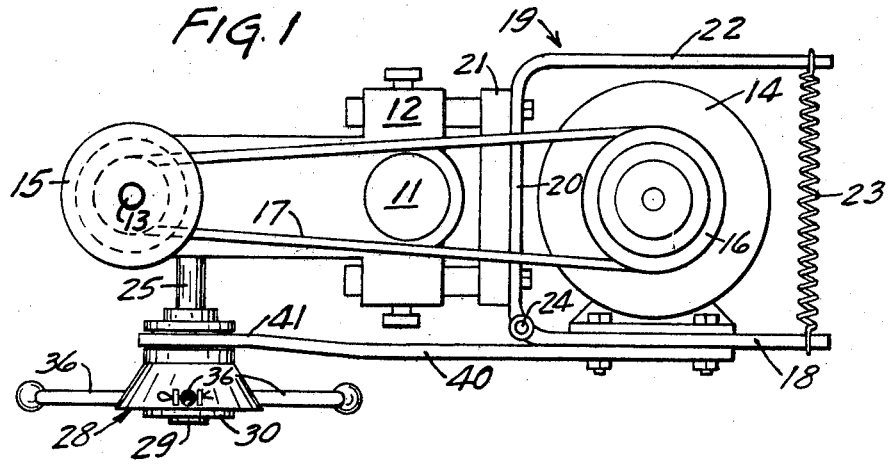
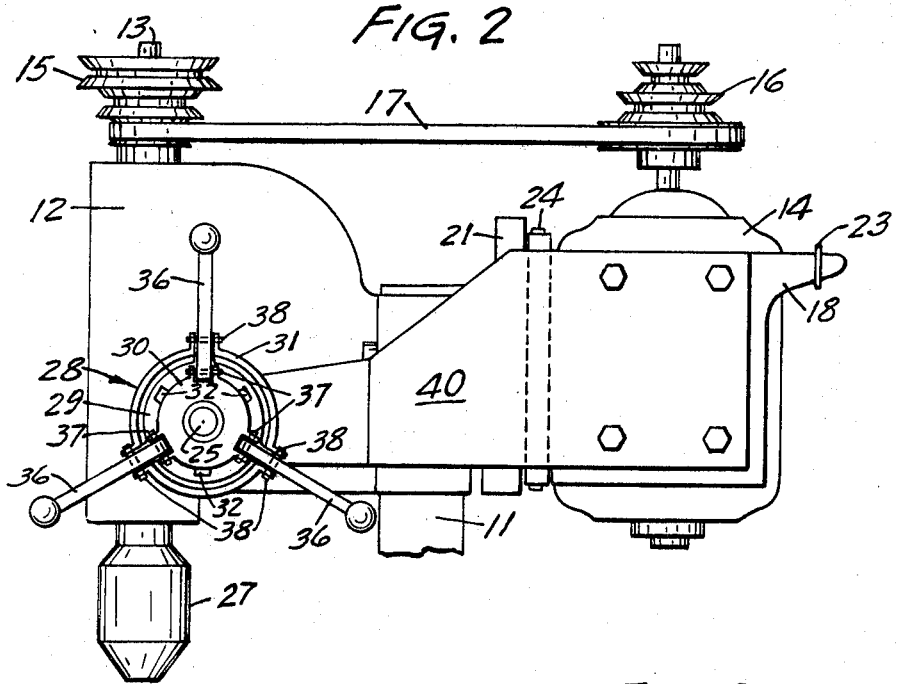
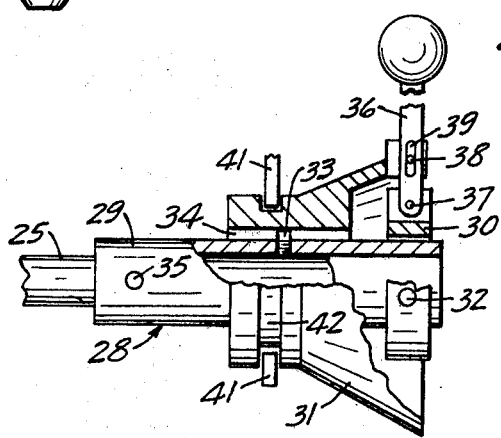
INVENTOR.
CARL S. MILLER
BY
Gilbert B. Gehrenbeck
AGENT

United States Patent Office 3,523,470
Patented Aug. 11, 1970

3,523,470
DRILL PRESS CONTROL DEVICE
Carl S. Miller, 44 Miller Crest Lane,
St. Paul, Minn. 55106
Filed May 1, 1968, Ser. No. 725,802
Int. Cl. B23b 47/16; F16h 7/14
U.S. Cl. 77—5                                5 Claims

ABSTRACT OF THE DISCLOSURE

A fail-safe clutch device for a drill press, wherein the drill-advancing handle members are pivotally mounted for lateral movement which is transmitted to a hinged motor mount, thereby controlling the rotation of the drill.

---

This invention relates to a safety device for a drill press, and has particular reference to fail-safe clutch means for controlling the rotation of the drill chuck.

A well-known form of drill press has a vertically slidable drill shaft carrying a drill chuck at its lower end. The shaft is rotated, through a V-belt and nested pulleys, by a motor positioned near the upper end. A rack member carrying the drill shaft meshes with a pinion on a control shaft carrying a handwheel having a series of radially extending spokes or levers, by means of which the drill may be forced toward or lifted from the workpiece. Rotation of the drill shaft and drill is controlled by starting or stopping the motor, for which purpose the operator must release the handwheel and locate and operate the motor switch. The time and attention required for such operation is sufficient to result in severe accidents in the event of an emergency such as a seized drill or the catching of a sleeve or other article of clothing in the rotating parts of the machine.

The present invention provides a simple but effective means for controlling the rotation of the drill without requiring the operator to remove his hand from the drill feed lever. At the same time the invention provides a fail-safe feature by permitting the rotation of the drill to stop whenever the drill feed lever is released. As an ancillary benefit the invention facilitates the transfer of the drive belt to another set of pulleys for changing the speed of rotation of the drill.

The device of the invention is illustrated in conjunction with components of a standard drill press of the type described.

In the drawing,

FIG. 1 is a partial top plan view of the device mounted on a drill press,

FIG. 2 is a side elevation of the assembly of FIG. 1, and

FIG. 3 is a partial front elevation showing a portion of the control assembly, partly cut away and in section.

The drill press of FIGS. 1 and 2 comprises a post 11 on which mounted a housing 12 carrying the dril shaft 13 at one end and the motor 14 at the other. The drill shaft and motor are fitted with opposing triple pulley assemblies 15 and 16 respectively, the pulleys being interconnected by a V-belt 17.

The motor 14 is mounted upon one leaf 18 of hinge member 19, the other leaf 20 being attached to the adjustable motor mounting plate 21 of the housing 12. The leaf 20 is extended, parallel to leaf 18 and beyond the motor, as lever arm 22. A tension spring 23 connecting the outer ends of leaf 18 and arm 22 urges the leaf 18 to rotate about the hinge pivot 24 in a direction to cause loosening of the drive belt 17.

A control shaft 25 disposed perpendicularly to the drill shaft 13 terminates in a pinion which meshes with the rack member carrying the drill shaft, these components being concealed within the housing 12. Rotation of the shaft 25 thus imparts vertical motion to the rotating drill shaft 13 and drill chuck 27.

A control assembly 28 includes a sleeve 29 extending beyond the end of the control shaft 25 and carrying a hub 30 and a grooved collar 31. The hub is affixed to the sleeve by set screws 32. The collar 31 is internally longitudinally grooved and slides along the sleeve 29, being prevented from rotating by a peg 33 set in the sleeve and fitting within the groove 34. The sleeve 29 is affixed to the shaft 25, e.g. by a pin 35. It will be appreciated that the sleeve serves merely to extend the shaft and may be omitted where a shaft of sufficient length is available, the several parts then being mounted directly on the shaft. However the assembly as shown may be pre-assembled and is presently preferred in that form as offering maximum convenience.

The hand levers 36, of which only one is shown in FIG. 3 for clarity, are pivotally fastened to hub 30 and collar 31 respectively by means of pins 37 and 38, the latter slidably fitting within a longitudinal slot 39 in the lever 36. Rotary movement of the handwheel levers 36 about the axis of the shaft 25 then results in moving the drill chuck and drill toward or away from the workpiece in conventional manner, whereas lateral force applied to a lever 36 results in axial movement of the collar 31 along the sleeve 29.

An arm 40 attached to the motor support leaf 18 of the hinge 19 extends forwardly as a bifurcate terminal member 41 fitting loosely within the circumferential groove 42 of collar 31. Axial movement of the collar thus results in swinging the motor mount 18 about the pivot 24 to cause loosening or tightening of the belt 17, and regulates the rotation of the drill. Periodic re-positioning of the adjustable mounting plate 21 serves to compensate for any changes in belt length.

The spring 23 biases the motor mount plate 18 in a direction to cause loosening of the belt 17 whereby to stop the rotation of the drill. The drill therefore is rotated only while lateral force is applied to a handle 36, thus giving the operator complete control over the drill action.

What is claimed is as follows:

1. In a drill press wherein rotative movement of a control shaft causes the drill to be advanced toward or retracted from the workpiece, said rotative movement being imparted through a handle extending radially of said shaft, the improvement comprising, in combination, pivot means for permitting pivotal movement of said handle in the axial plane of said shaft and clutch means responsive to said pivotal movement for controlling the rotation of said drill.

2. The device of claim 1 wherein said handle is pivotally mounted on a hub attached to said control shaft, and said clutch means comprises a circumferentially grooved collar axially slidably disposed about said shaft adjacent said hub, said handle being pivotally attached to said collar at a point radially removed from the point of attachment of said handle to said hub.

3. The device of claim 2 wherein said clutch means includes a lever arm extending between said grooved collar and a hingedly supported motor mounting plate.

4. As a replacement assembly for the control shaft handwheel of a drill press, in combination: a sleeve extension for the control shaft; a handwheel having a hub carried by said sleeve and having spoke-like handles pivotally attached to said hub for movement in the axial plane of said shaft; and a circumferentially grooved collar carried by said sleeve adjacent said hub, slidable along said sleeve and making pivotal connection with said handles at a point radially removed from the point of attachment of each said handle to said hub.

5. The device of claim 3 wherein is employed belt drive means for transmitting power from said motor to said drill, and including biasing means urging said motor mounting plate in a direction to cause loosening of said belt.

References Cited

UNITED STATES PATENTS 2,357,690   9/1944   Rugheimer _____ 77—34 XR

FRANCIS S. HUSAR, Primary Examiner

U.S. Cl. X.R.

74—242.8, 242.15; 77—34.6